(12) United States Patent
Whitt

(10) Patent No.: US 10,749,926 B2
(45) Date of Patent: Aug. 18, 2020

(54) PROXY FOR MODIFYING HTTP MESSAGES TO COMPLY WITH BROWSER

(71) Applicant: RIMINI STREET, INC., Las Vegas, NV (US)

(72) Inventor: Desmond Whitt, Pleasanton, CA (US)

(73) Assignee: RIMINI STREET, INC., Las Vegas, NV (US)

( * ) Notice: Subject to any disclaimer, the term of this patent is extended or adjusted under 35 U.S.C. 154(b) by 152 days.

(21) Appl. No.: 14/260,024

(22) Filed: Apr. 23, 2014

(65) Prior Publication Data

US 2015/0312313 A1 Oct. 29, 2015

(51) Int. Cl.
*G06F 15/16* (2006.01)
*H04L 29/08* (2006.01)

(52) U.S. Cl.
CPC ............ *H04L 67/02* (2013.01); *H04L 67/025* (2013.01); *H04L 67/10* (2013.01); *H04L 67/2823* (2013.01)

(58) Field of Classification Search
CPC ................................. H04L 67/02; H04L 67/10
USPC ....... 709/217, 223, 225, 250, 229, 237, 227, 709/203, 232, 202, 224; 715/234; 705/7.37, 14.41
See application file for complete search history.

(56) References Cited

U.S. PATENT DOCUMENTS

| | | | |
|---|---|---|---|
| 7,523,158 B1 | 4/2009 | Nickerson et al. | |
| 7,779,130 B1* | 8/2010 | Toutonghi | H04L 67/06 709/227 |
| 8,788,612 B1* | 7/2014 | Levesque | H04L 67/02 709/217 |
| 9,811,590 B1* | 11/2017 | Acharya | G06F 16/958 |
| 2002/0138331 A1* | 9/2002 | Hosea | G06F 17/30905 705/7.37 |
| 2006/0031442 A1* | 2/2006 | Ashley | H04L 67/02 709/223 |
| 2007/0124471 A1* | 5/2007 | Harada | G06Q 20/206 709/225 |
| 2008/0158612 A1* | 7/2008 | Iwasaki | G06T 7/0081 358/3.26 |
| 2008/0183573 A1* | 7/2008 | Muschetto | G06Q 30/02 705/14.41 |
| 2008/0183902 A1* | 7/2008 | Cooper | H04L 67/2823 709/250 |
| 2008/0194239 A1* | 8/2008 | Hagan | H04L 43/00 455/414.2 |
| 2008/0282346 A1* | 11/2008 | Gudeth | G06F 21/563 726/22 |
| 2010/0211626 A1* | 8/2010 | Li | H04L 67/2861 709/203 |
| 2011/0093610 A1* | 4/2011 | Rezaiifar | H04L 67/02 709/232 |

(Continued)

OTHER PUBLICATIONS

Kannel, "Open Source WAP and SMS gateway", Copyright 2001-2013, The Kannel Group, 2 pages, http://www.kannel.org/.

(Continued)

*Primary Examiner* — Thuong Nguyen
(74) *Attorney, Agent, or Firm* — Shook, Hardy & Bacon LLP

(57) ABSTRACT

A proxy server includes various components to modify HTTP communications between a client and a server. Generally, an HTTP request or response is received. The request or response is modified in-stream by a proxy-process module that is running within a web-server-process space.

23 Claims, 4 Drawing Sheets

(56) References Cited

U.S. PATENT DOCUMENTS

| | | | | |
|---|---|---|---|---|
| 2011/0106874 A1* | 5/2011 | Walsh | ............... | H04L 67/02 709/202 |
| 2011/0231477 A1* | 9/2011 | Safruti | ............... | G06F 9/5033 709/203 |
| 2012/0084756 A1* | 4/2012 | Subramanian | ...... | G06F 11/3676 717/124 |
| 2012/0246264 A1* | 9/2012 | Bodorik | ............... | H04L 67/02 709/217 |
| 2012/0254728 A1* | 10/2012 | Liu | ............... | H04L 67/1002 715/234 |
| 2012/0297288 A1* | 11/2012 | Mansouri | ......... | G06F 17/30893 715/234 |
| 2013/0019301 A1 | 1/2013 | Reddy et al. | | |
| 2013/0227607 A1* | 8/2013 | Saltonstall | .......... | H04N 21/458 725/35 |
| 2016/0191348 A1* | 6/2016 | Lee | ............... | H04L 43/028 709/224 |

OTHER PUBLICATIONS

Rousskov, Alex, SquidFaq Content Adaptation, Mar. 17, 2013, 4 pages, http:wiki.squid-cashe.org/SquidFaq/ContentAdapation.

Elson, J, et al., Internet Content Adaptation Protocol (ICAP), UCLA, Apr. 2003, 46 pages, https://www.ietf.org/rfc/rfc3507.txt.

Squid Configuration Directive ACL, May 9, 2013, 5 pages, http://www.squid-cache.org/Doc/config/acl/.

Squid Configuration Directive icap_service, May 9, 2013, 3 pages, http://www.squid-cache.org/Doc/config/icap_service/.

Squid Configuration Directive icap_access, May 9, 2013, 2 pages, http://www.squid-cache.org/Doc/config/icap_service/.

Pyicap 1.0a7, A Framework for writing ICAP servers, Jun. 4, 2013, 4 pages, https://pypi.python.org/pypi/pyicap/1.0a7.

NPM, Nodecap, Copyright 2004, 3 pages, https://www.npmjs.org/package/nodecap/.

Davids, Enno, ICAP—The Internet Content Adaption Protocol, AUUG 2004—Who are You, pp. 71-78, http://www.auug.org.au/resources/proceedings/auug2004/davids.pdf.

Rousskov, Alex, eCAP the cod in the middle, Feb. 21, 2011, 1 page, http://www.e-cap.org/.

Apache HTTP Server Version 2.4, Apache Module mod_filter, Copyright 2014, 8 pages, http://httpd.apache.org/docs/current/mod/mod_filter.html.

Apache HTTP Server Version 2.4, Apache Module mod_substitute, Copyright 2014, 3 pages, http://httpd.apache.org/docs/current/mod/mod_substitute.html.

Apache HTTP Server Version 2.4, Apache Module mod_sed, Copyright 2014, 3 pages, http://httpd.apache.org/docs/current/mod/mod_sed.html.

Apache HTTP Server Version 2.4, Apache Module mod_ext_filter, Copyright 2014, 5 pages, http://httpd.apache.org/docs/current/mod/mod_ext_filter.html.

International Search Report with Written Opinion dated Sep. 14, 2015 in Application No. PCT/US15/25933, 9 pages.

International Preliminary Report on Patentability dated Nov. 3, 2016 for International Patent Application No. PCT/US2015/025933, 7 pages.

* cited by examiner

PROXY FOR MODIFYING HTTP MESSAGES TO COMPLY WITH BROWSER

BACKGROUND

Often a browser (e.g., web browser) is updated in a manner that changes how resources (e.g., web pages) are rendered. As such, it is sometimes necessary for the resource itself, or the server providing the resource, to include updated code that complies with the updated browser. Failure to include the updated code can result in a failure to render the resource properly.

SUMMARY

Generally, an embodiment of the present invention is directed to a proxy that modifies HTTP (Hypertext Transfer Protocol) communications (e.g., request, response, or both) between agents and an origin server to comply evolving protocol standards of the agents. This invention serves to uncouple technical communication dependencies between the agent and the origin server. The invention allows these communication standards to evolve and be satisfied on the part of the agents and be maintained and stable on the part of the origin server.

One embodiment of the present invention is directed to operations for modifying an HTTP communication that might be stored on a computer-readable medium. The operations include receiving from a client an HTTP request comprising a user-agent identifier. In addition, a proxy-process module running within a web-server-process space is executed by retrieving a request modification stored in association with the user-agent identifier within the proxy-process module. In one aspect, retrieving the request modification is performed in-stream without calling an external program. In addition, the request modification might be retrieved from a text file, which is stored in the web-server-process space. Among other things, the request modification might include a modification to a body of the HTTP request. The operations further include transforming the HTTP request into a modified HTTP request by applying the request modification. A resource is requested by forwarding the modified HTTP request to another server.

Another embodiment of the present invention is directed to other operations for modifying an HTTP communication that might be stored on a computer-readable medium. The operations include receiving from a server an HTTP response comprising a user-agent identifier. In addition, a proxy-process module running within a web-server-process space is executed by retrieving a response-body modification stored in association with the user-agent identifier within the proxy-process module. In one aspect, retrieving the response-body modification is performed in-stream without calling an external program. In addition, the response-body modification might be retrieved from a text file, which is stored in the web-server-process space. Among other things, the response-body modification might modify instructions for rendering a requested resource. The operations further include transforming the HTTP response into a modified HTTP response by applying the response-body modification to a body of the HTTP response. The modified HTTP response is provided for transmission to a client.

A further embodiment also includes operations for modifying an HTTP communication that might be stored on a computer-readable medium. The operations include receiving an HTTP response comprising a user-agent identifier. In addition, a proxy-process module running within a web-server-process space is executed by retrieving a cached content item stored in association with the user-agent identifier within the proxy-process module. In one aspect, the cached content item is stored in the web-server-process space. The cached content item is provided for transmission to a client.

In an additional embodiment, the present invention includes operations for modifying an HTTP communication comprising that might be stored on a computer-readable medium. The operations include receiving by a server application an HTTP communication and routing the HTTP communication to an in-stream modification module running in a same processing space as the server application. In one aspect, the in-stream modification module includes a mod_perl in-memory module running in an Apache process space. In addition, the operations include executing a parser to apply one or more transformation rules to the HTTP communication. In one aspect, the parser includes a YAML parser. In a further aspect, the one or more transformation rules are stored in a text file. A transformed HTTP communication is passed back to the server application to be transmitted to a recipient. The HTTP communication might be an HTTP request received from a user-agent browser, and the one or more transformation rules might modify a body of the HTTP request. As such, the recipient might be an origin server. In a different aspect, the HTTP communication might be an HTTP response received from an origin server, such that the recipient is a user-agent browser.

Another embodiment of the present invention includes a system of components that is implemented on an HTTP server using a processor coupled to one or more computer-readable media and that is for modifying HTTP communications. The system includes a proxy module that receives the HTTP communications and that runs in a web-serving-process space of the HTTP server. In one aspect, the proxy module includes a mod_perl module. The proxy module is configured to determine modifications for application to the HTTP communications. The system also includes a rules file maintained in the web-serving-process space that is accessible by the proxy module to reference the modifications. In one aspect, the rules file is in a form of a condition-and-modification directive. An exemplary condition might be a user-agent identifier. In addition, exemplary modifications might include modifications of HTTP communication headers or bodies. In addition, the system includes a stream-modification module that runs in the web-serving-process space and that applies the modifications to the HTTP communication in-stream without calling an external program. In one aspect, the system is a gateway for a cluster of one or more other servers that provide HTTP responses to HTTP requests received by the proxy module. In another aspect, the system might include other components, such as a cache that is stored in the web-serving-process space and that maintains cached content for responding to the HTTP communications.

Embodiments of the invention are defined by the claims below, not this summary. A high-level overview of various aspects of the invention is provided here to provide an overview of the disclosure, and to introduce a selection of concepts that are further described below in the detailed-description section. This summary is not intended to identify key or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different elements or combinations of elements similar to the ones described in this document, in conjunction with other present or future technologies. Terms should not be interpreted as implying any particular order among or between various steps herein disclosed except when the order of individual steps is explicitly stated.

An embodiment of the present invention is directed to a proxy that modifies an HTTP (Hypertext Transfer Protocol) communication (e.g., request, response, or both) to comply with a browser. For example, an HTTP request or response is received. The request or response is modified in-stream by a proxy-process module that is running within a web-server-process space. As such, the proxy-process module does not have to call an external program or server. This proxy-process module refers to the invention rather than the standard apache mod_proxy module which is used to connect the invention to the origin server.

Figure 1:
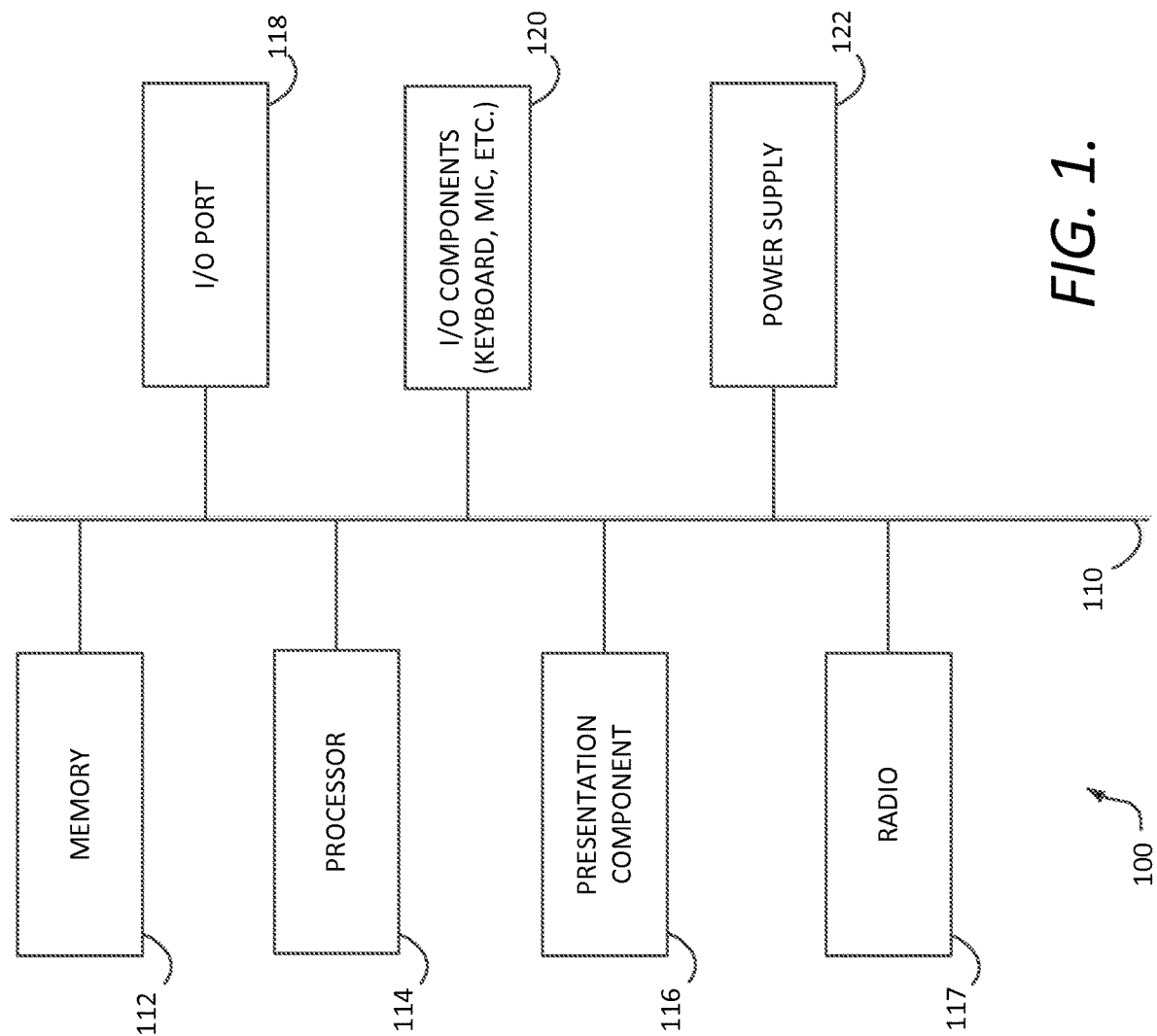
FIG. 1 depicts a general computing environment in accordance with an embodiment of the present invention.

Having briefly described an embodiment of the present invention, a general computing environment is now described with respect to FIG. 1. That is, embodiments of the present invention might include, among other things, a computing device, a component of a computing device, a computer-readable medium or other device that stores instructions executed by a computing device, a method that is executed by a computing device, and the like. Thus, these various embodiments might include at least some of the elements described with respect to FIG. 1.

FIG. 1 illustrates an exemplary computing environment for implementing embodiments of the present invention and is generally designated as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, radio 117, input/output ports 118, input/output components 120, and an illustrative power supply 122. Bus 110 represents what may be one or more busses (such as an address bus, data bus, or combination thereof).

Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EEPROM; flash memory or other memory technology; CD-ROM; digital versatile disks (DVD) or other optical disk storage; magnetic cassettes, magnetic tape, magnetic disk storage or other magnetic storage devices; or other computer storage devices which can be used to store the desired information and which can be accessed by computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

Radio 117 functions to send and receive signals from a network, such as a telecommunications network. I/O ports 118 allow computing device 100 to be logically coupled to other devices including I/O components 120, some of which may be built in.

Figure 2:
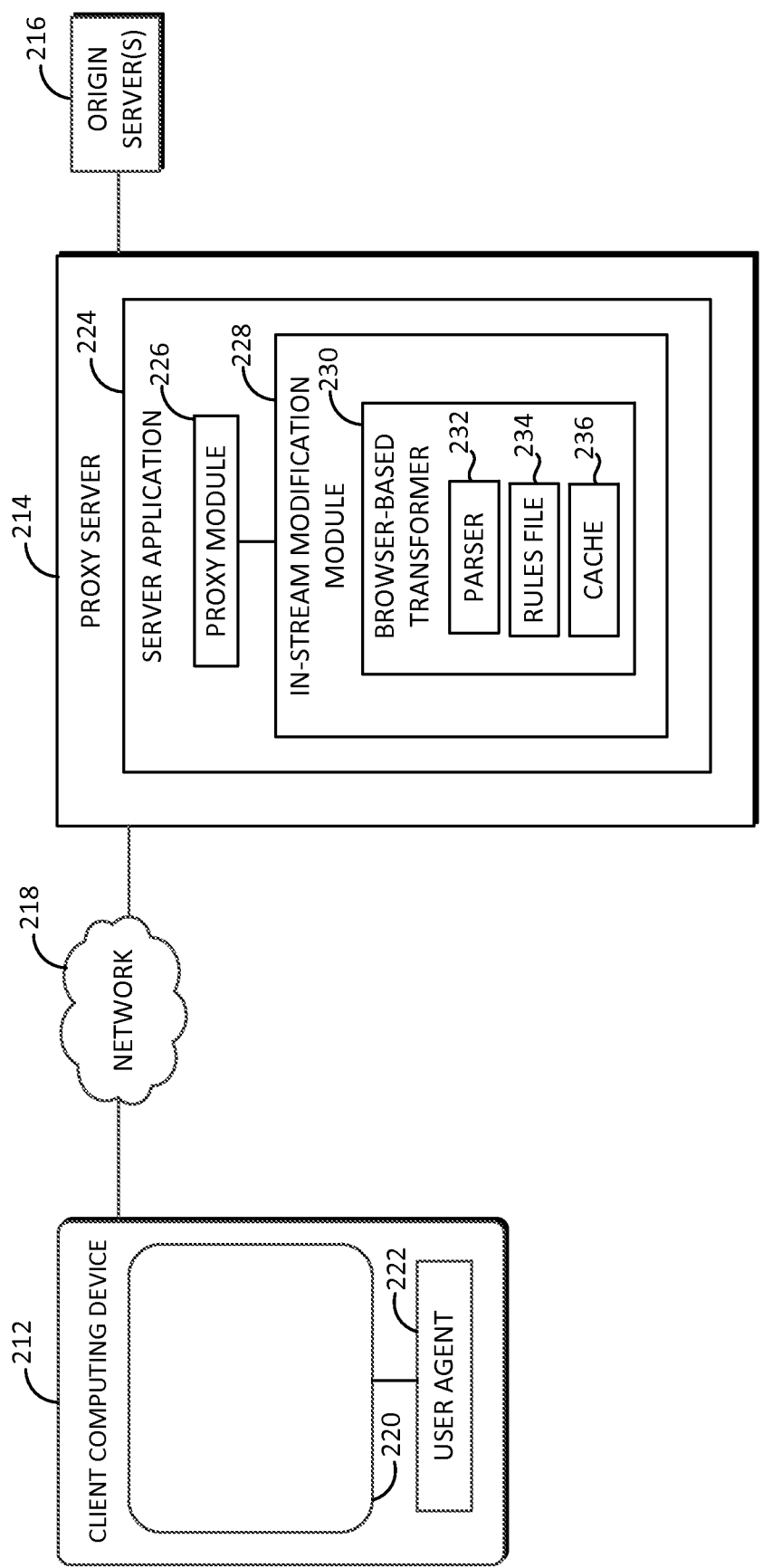
FIG. 2 depicts a client-server computing environment in accordance with an embodiment of the present invention.

Referring now to FIG. 2, an exemplary environment 210 is depicted in accordance with an embodiment of the present invention. FIG. 2 includes a computing device 212, a proxy server 214, and an origin server 216 that communicate with one another via a network 218. Both the computing device 212 and the servers 214, 216 are types of computing devices that include some or all of the components described with respect to FIG. 1. The network 218 might include various types of networks, such as an intranet, LAN (Local Area Network), WAN (Wide Area Network), mobile-telecommunications network, and the Internet.

Each of the components depicted by FIG. 2 will now be described in more detail. The computing device 212 might be any of a variety of different device types, such as a mobile computing device (e.g., smart phone), desktop, laptop, tablet, and the like. The computing device 212 includes various components, such as an input device, output device (e.g., display 220), application (e.g., browser or other user agent 222), and the like. The user agent 222 functions to, among other things, request resources from the origin server 216 and display the resources on the display 220.

The origin server 216 includes a backend server that maintains and provides resources, which can be requested by the client computing device 212. The origin server 216 includes some or all of the elements described with respect to FIG. 1, such as a processor, memory, and the like. In addition, although only one server is depicted in FIG. 2, in reality the origin server might include a plurality of servers, which provide resources that are maintained across a distributed environment.

In one embodiment, the origin server 216 includes an enterprise-software system that is accessible by the computing device 212. For example, the enterprise-software system might include a SAP® backend system or similar system. Typically, the origin server 216 is configured to respond to requests for resources generated by the user agent 222. When responding to requests (e.g., HTTP requests), responses provided by the origin server 216 often comply with specified standards and protocol so that the responses are usable by the user agent 222.

But in some instances the origin server 216 is not configured to provide a response that can be properly rendered by the user agent 222. For example, the user agent 222 might have been updated to a new version (e.g., new browser or new user device), which utilizes a different request or response than the origin server 216. As such, an embodiment of the present invention includes the proxy server 214, which sits between the user agent 222 and the origin server 216 and applies in-stream modifications or cache retrieval for requests and responses. Absent the proxy server 214, modifying or caching is often slower and subject to security issues.

The proxy server 214 includes various components. For example, the proxy server 214 includes a server application 224 that provides a software framework for leveraging the proxy server 214 to perform various functions. An example of a server application is Apache HTTP®. The server application 224 is extensible in that is allows the addition of modules to customize functionality. Often, the proxy server 214 and the server application 224 are invisible in a sense to the end user connecting to the origin server.

In one embodiment, the server application 224 includes a proxy module 226, which functions to manage traffic between the user agent 222 and the origin server 216. Among other things, the proxy module 226 might filter, transform, modify, cache, route, etc. requests and responses between the user agent 222 and the origin server 216. That is, the proxy module 226 functions as an intermediary for HTTP requests sent from the user agent 222 to the origin server 216, as well as HTTP responses sent from the origin server 216 to the user agent 222. An example of a proxy module is "mod_proxy" implemented in an Apache process space. The Apache mod_proxy establishes a simple transparent proxy. The proxy server extends this function to allow for manipulation of the HTTP communications.

In a further embodiment, the proxy module 226 includes an in-stream modification module 228 that allows the proxy module 226 to perform in-stream modifications of requests and responses exchanged between the user agent 222 and the origin server 216. The in-stream modification module 228 allows the HTTP communications to be transformed without calling an external program or another server. Running the modification module directly in the server-process space in this manner facilitates faster and more secure proxy operations. The in-stream modification module might be programmed in various manners, and in one embodiment, the in-stream modification module 228 includes a "mod_perl" module. This "mod_perl" module refers to the Apache module that allows a Perl interpreter to be added to the Apache HTTP server. Perl is a general purpose language developed by Larry Wall in 1987.

The in-stream modification module 228 includes various components and might modify HTTP communications based on various criteria. In one embodiment, the in-stream modification module 228 leverages a browser-based transformer 228, which modifies or transforms HTTP communications based on the user agent 222. For example, the browser-based transformer 228 might make changes based on a browser and browser version that submit an HTTP request and that will receive an HTTP response. Although exemplary embodiments of the present invention describe making modifications and transformations to HTTP communications based on a browser type and version, other criteria might also, or alternatively, be used to determine how to modify HTTP communications. The browser-based transformer 228 is executed within the server-process space as part of the in-stream modification module 228.

The browser-based transformer 228 includes various components, such as a parser 232, a rules file 234, and a cache 236. The parser 232 performs various operations to determine how an HTTP communication should be modified. For example, the parser 232 might programmatically analyze an HTTP request or response to determine an identity and version of the user agent 222. Among other things, the parser 232 might determine a user-agent identifier included in the response or request. The parser 232 might be based on various formats, and in one embodiment the parser 232 uses YAML.

Upon identifying the user agent 222, a determination is made as to how the HTTP communication should be transformed by referencing the in-memory rules file 234, the cache 236, or a combination thereof. The proper rules and cached content can then be loaded into the browser-based transformer 230 and used to transform the header, body, or both of the HTTP request or response. By applying a rules model with rules stored in a text file, the set of rules can be modified and are extensible without changing code or restarting the service.

In a further embodiment, the transformed HTTP communication is passed back to the server application 224 for transmission to a respective recipient. For example, in Apache® a ProxyPass component might be leveraged to transmit a transformed HTTP request to the origin server 216. In addition, a transformed HTTP response can be passed back to the server application 224 for transmission to the user agent 222.

As previously indicated, the origin server 216 might be a plurality or cluster of servers that maintain resources in a distributed environment. As such, the proxy server 214 might operate as a gateway to the cluster of servers.

Figure 3:
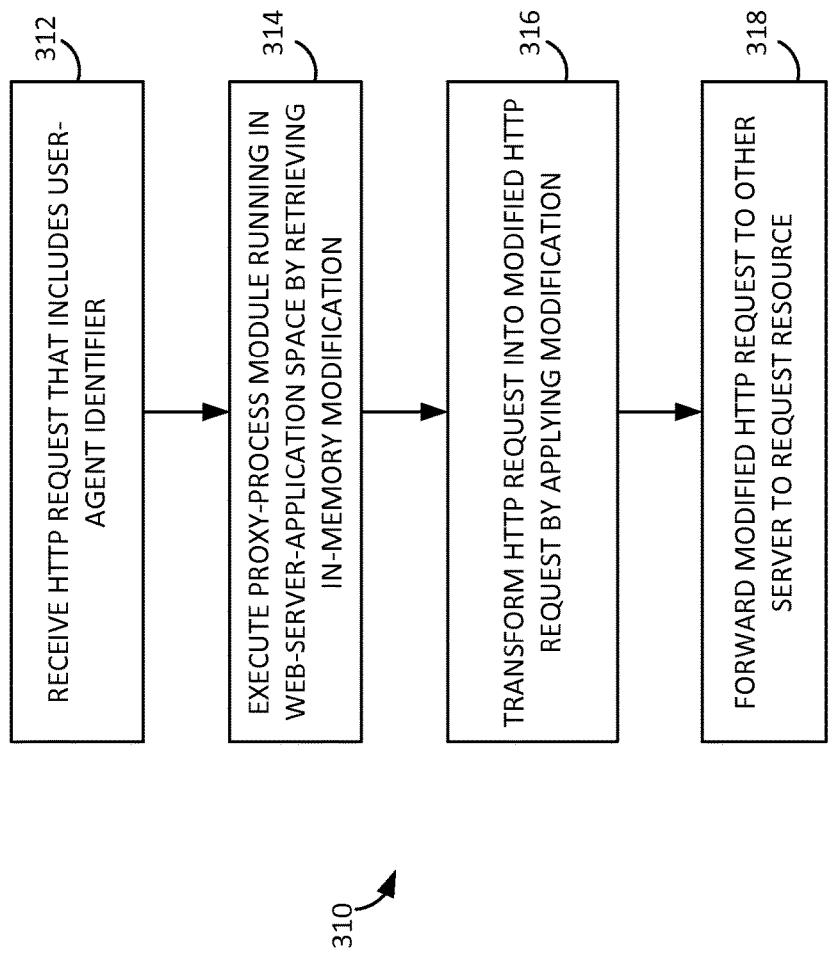
FIGS. 3 and 4 each depict a respective flow diagram, each of which includes a respective series of steps carried out in accordance with an embodiment of the present invention.

Referring now to FIG. 3, a flow diagram is depicted that includes a series of steps or operations that are carried out in accordance with an embodiment of the present invention. The series of steps in FIG. 3 comprises a method or process 310 of modifying an HTTP communication. The invention might be embodied as a computer-implemented method that includes the steps summarized in FIG. 3. The invention might also be embodied as a computing device that is programed to perform the operations outlined in FIG. 3. In another embodiment, the present invention includes a computer-storage device storing computer-executable instructions that, when performed by a computing device, perform the method 310. When describing method 310, reference is also made to FIG. 2.

In method 310, step 312 includes receiving from a client an HTTP request comprising a user-agent identifier. For example, the proxy server 214 might receive a request that is sent from the user agent 222 and that includes an identifier of the user agent 222. In addition, the request might be routed through the proxy server 214 to the server application 224, proxy module 226, in-stream modification module 228, and browser-based transformer 230, such that any of these components could be said to have received the request.

At step 314, a proxy-process module is executed that is running within a web-server-process space. The proxy-process module is executed by retrieving a request modification stored in association with the user-agent identifier within the proxy-process module. For example, each of the proxy-module 226, in-stream modification module 228, and browser-based transformer 230 might fall under the classification of a proxy-process module, and each of these modules is executed in the process space of the server application 224. In addition, a request modification is retrieved by parsing the HTTP request and loading the associated rules or cached content into the browser-based transformer 230. In one embodiment, when the invention is executed in an Apache® HTTP process space, the Apache® web-server application might direct the HTTP request to a mod_perl (as previously defined) in-memory program, such as the in-stream modification module 228.

Step 316 includes transforming the HTTP request into a modified HTTP request by applying the request modification. That is, the browser-based transformer 230 applies the rules or cached content to the HTTP request to create a modified HTTP request. In one embodiment, the browser-based transformer 230 executes a YAML (data oriented markup language) parser to apply a set of transformation rules to modify the header, body, or both of the HTTP request.

In step 318, the modified HTTP request is forwarded to another server to request a resource. For instance, the modified HTTP request might be passed back to the server application 224 to be forwarded to the origin server 216. When the server application 224 includes an Apache® server application, then a ProxyPass component might be leveraged to transmit the modified HTTP request to the origin server(s) to request a resource.

Figure 4:
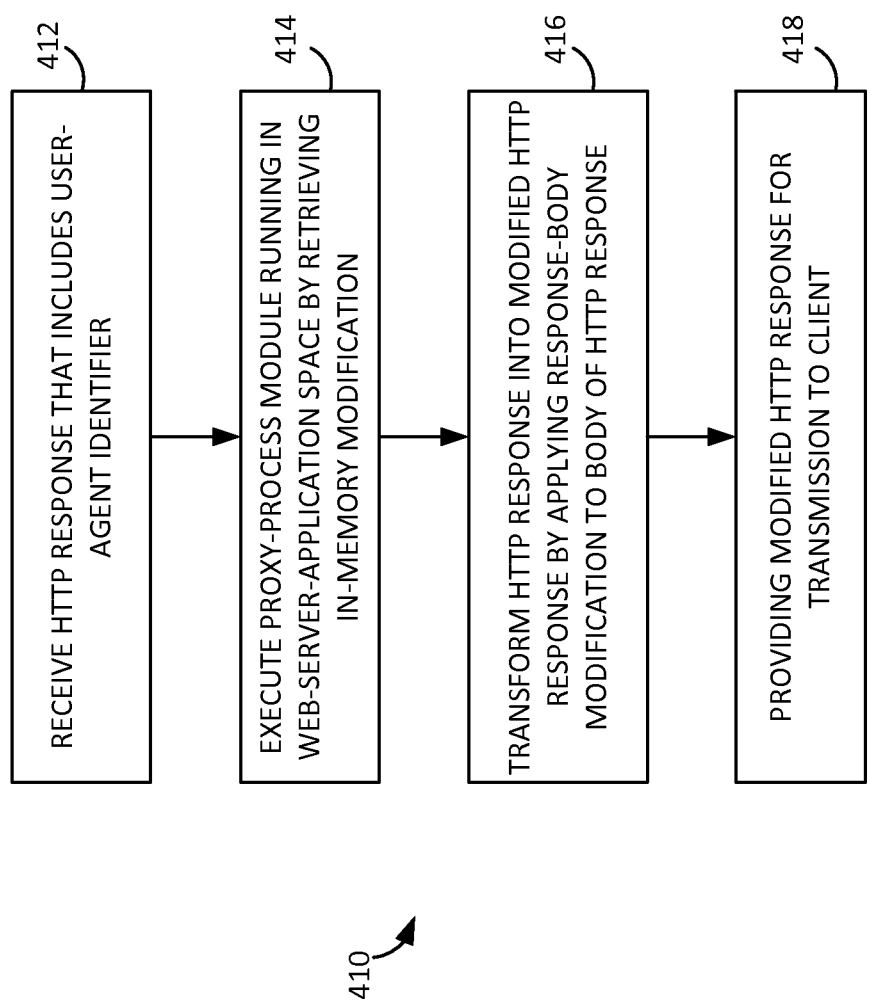

Referring now to FIG. 4, a flow diagram is depicted that includes a series of steps or operations that are carried out in accordance with an embodiment of the present invention. The series of steps in FIG. 4 comprises a method or process 410 of modifying an HTTP communication. The invention might be embodied as a computer-implemented method that includes the steps summarized in FIG. 4. The invention might also be embodied as a computing device that is programed to perform the operations outlined in FIG. 4. In another embodiment, the present invention includes a computer-storage device storing computer-executable instructions that, when performed by a computing device, perform the method 410. When describing method 410, reference is also made to FIG. 2.

Step 412 of the method 410 includes receiving from a server an HTTP response comprising a user-agent identifier. For example, the proxy server 214 might receive a response that is sent from the origin server 216 and that includes an identifier of the user agent 222. In addition, the response might be routed through the proxy server 214 to the server application 224, proxy module 226, in-stream modification module 228, and browser-based transformer 230, such that any of these components could be said to have received the response. In one embodiment, the HTTP response is a reply to the modified HTTP request that was described with respect to FIG. 3.

Step 414 includes executing a proxy-process module running within a web-server-process space by retrieving a response-body modification stored in association with the user-agent identifier within the proxy-process module. For example, each of the proxy-module 226, in-stream modification module 228, and browser-based transformer 230 might fall under the classification of a proxy-process module, and each of these modules is executed in the process space of the server application 224. In addition, a response-body modification is retrieved by parsing the HTTP response and loading the associated rules or cached content into the browser-based transformer 230. In one embodiment, when the invention is executed in an Apache® HTTP process space, the Apache® web-server application might direct the HTTP response to a mod_perl in-memory program, such as the in-stream modification module 228. Although step 414 includes retrieving a response-body modification, other modifications might also be retrieved, such as a response-header modification.

At step 416, the HTTP response is transformed into a modified HTTP response by applying the response-body modification to a body of the HTTP response. The transformation might include modifying the response body based on a rule or with cached content.

Step 418 includes providing the modified HTTP response for transmission to a client. For instance, the modified HTTP response might be passed back to the server application 224 to be transmitted to the client computing device 212. When the modified HTTP response is provided to the client computing device, the user agent 222 is able to accurately render the requested resource.

As explained above, embodiments of the present invention provide a complete content-modification system that enables headers and bodies to be modified and transformed to allow backend systems to support new browsers and devices. The in-stream modification system modifies headers and content for the purpose of supporting new clients and browsers without necessarily requiring any code modification to an existing content or origin server.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A non-transitory computer-readable media storing computer-usable instructions that, when executed by a computing device, perform operations for modifying an HTTP communication comprising:
   receiving from a client an initial HTTP request comprising a user-agent identifier for at least one user-agent, wherein the user-agent is at least one of a browser or client device;
   executing a proxy-process module running within a web-server-process space by determining the user-agent identifier of the initial HTTP request and retrieving a request modification corresponding to the determined user-agent identifier stored within the proxy-process module, wherein the retrieving the request modification is performed in-stream within the web-server-process space by an in-stream modification module including a mod perl in-memory module running in an Apache process space;
   transforming the initial HTTP request into a modified HTTP request at the proxy-process module by applying the request modification to the initial HTTP request, the request modification comprising at least one executable rule to change at least a portion of the initial HTTP request;
   requesting a resource by forwarding the modified HTTP request to another server, wherein the modified HTTP communications enable an origin server to communicate in compliance with a user-agent having an evolved protocol standard; and
   responsive to the requesting, providing the resource to the client based on the modified HTTP request.

2. The computer-readable media of claim 1, wherein the request modification is retrieved from a text file.

3. The computer-readable media of claim 1, wherein the text file is stored in the web-server-process space.

4. The computer-readable media of claim 1, wherein the request modification includes a modification to a body of the HTTP request.

5. A non-transitory computer-readable media storing computer-usable instructions that, when executed by a computing device, perform operations for modifying an HTTP communication comprising:
   receiving from a server an HTTP response comprising a user-agent identifier for at least one user-agent, wherein the user-agent is at least one of a client device or software running on a client device;
   executing a proxy-process module running within a web-server-process space by determining the user-agent identifier of the initial HTTP request and retrieving a response-body modification corresponding to the determined user-agent identifier stored within the proxy-process module, wherein the retrieving the response-body modification is performed in-stream within the web-server-process space by an in-stream modification module including a mod perl in-memory module running in an Apache process space;
   transforming the HTTP response into a modified HTTP response at the proxy-process module by applying the response-body modification to a body of the HTTP response, the request modification comprising at least one of an executable rule or cached content to change at least a portion of the initial HTTP request; and
   providing the modified HTTP response for transmission to a client based on the modified HTTP request.

6. The computer-readable media of claim 5, wherein the response-body modification is retrieved from a text file.

7. The computer-readable media of claim 5, wherein the text file is stored in the web-server-process space.

8. The computer-readable media of claim 5, wherein the response-body modification modifies instructions for rendering a requested resource.

9. A non-transitory computer-readable media storing computer-usable instructions that, when executed by a computing device, perform operations for modifying an HTTP communication comprising:
   receiving an initial HTTP response comprising a user-agent identifier for at least one user agent, wherein the user agent is at least one of a browser or client device;
   executing a proxy-process module running within a web-server-process space by determining the user-agent identifier of the initial HTTP request and retrieving a cached content item corresponding to the determined user-agent identifier stored within the proxy-process module wherein the retrieving the cached content item is performed in-stream within the web-server-process space by an in-stream modification module including a mod perl in-memory module running in an Apache process space;
   transforming the initial HTTP response into a modified HTTP response at the proxy-process module by applying a response modification to the initial HTTP response, the response modification comprising at least one executable rule to change at least a portion of the initial HTTP response;
   providing the cached content item for transmission to a client based on the modified HTTP response.

10. The computer-readable media of claim 9, wherein the cached content item is stored in the web-server-process space.

11. A system of components that is implemented on an HTTP server using a processor coupled to one or more non-transitory computer-readable media and that is for modifying HTTP communications, the system comprising:
   a proxy module that receives the HTTP communications and that runs in a web-serving-process space of the HTTP server, the proxy module including a mod perl module and configured to determine modifications for application to the HTTP communications;
   a rules file maintained in the web-serving-process space and that is accessible by the proxy module to reference the modifications based on a determination of a user-agent identifier for at least one user agent, the user agent being at least one of a browser or client device, wherein the modifications correspond to the determined user-agent identifier; and a stream-modification module that runs in the web-serving-process space and that retrieves and applies the modifications, based on the user-agent identifier, to the HTTP communications in-stream to transform the HTTP communications into modified HTTP communications, wherein the modified HTTP communications enable an origin server to communicate in compliance with an agent having an evolved protocol standard.

12. The system of claim 11 further comprising, a cache that is stored in the web-serving-process space and that maintains cached content for responding to the HTTP communications.

13. The system of claim 11, wherein the rules file is in a form of a condition-and-modification directive.

14. The system of claim 13, wherein one condition includes the user-agent identifier.

15. The system of claim 11, wherein the modifications include modification of HTTP communication headers.

16. The system of claim 11, wherein the modifications include modification of HTTP communication bodies.

17. The system of claim 11, wherein the system is a gateway for a cluster of one or more other servers that provide HTTP responses to HTTP requests received by the proxy module.

18. A non-transitory computer-readable media storing computer-usable instructions that, when executed by a computing device, perform operations for modifying an HTTP communication comprising:
    receiving by a server application an HTTP communication comprising a user-agent identifier for at least one user-agent, the user agent being at least one of a browser or a client device;
    routing the HTTP communication to an in-stream modification module running in a same processing space as the server application, wherein the in-stream modification module includes a mod perl in-memory module running in an Apache process space;
    executing a parser to apply one or more transformation rules to the HTTP communication based on an identification of the user-agent to transform the HTTP communication into a modified HTTP communication; and
    passing a transformed HTTP communication back to the server application to be transmitted to a recipient, wherein the transformed HTTP communication enables the server to communicate with a user-agent having an evolved protocol standard.

19. The computer-readable media of claim 18, wherein the parser includes a YAML parser.

20. The computer-readable media of claim 19, wherein the one or more transformation rules are stored in a text file.

21. The computer-readable media of claim 18, wherein the HTTP communication is an HTTP request received from a user-agent browser, and wherein the one or more transformation rules modify a body of the HTTP request.

22. The computer-readable media of claim 21, wherein the recipient includes an origin server.

23. The computer-readable media of claim 18, wherein the HTTP communication is an HTTP response received from an origin server, and wherein the recipient is a user-agent browser.

* * * * *